United States Patent
Zhang et al.

(10) Patent No.: US 12,197,277 B2
(45) Date of Patent: Jan. 14, 2025

(54) CLASSIFICATION-BASED ERROR RECOVERY WITH REINFORCEMENT LEARNING

(71) Applicant: Micron Technology, Inc., Boise, ID (US)

(72) Inventors: Lei Zhang, Singapore (SG); Francis Chee Khai Chew, Singapore (SG); Michael Miller, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 119 days.

(21) Appl. No.: 17/880,155

(22) Filed: Aug. 3, 2022

(65) Prior Publication Data

US 2024/0045754 A1 Feb. 8, 2024

(51) Int. Cl.
*G06F 11/07* (2006.01)
*G06N 5/022* (2023.01)

(52) U.S. Cl.
CPC ........ *G06F 11/0793* (2013.01); *G06F 11/073* (2013.01); *G06N 5/022* (2013.01)

(58) Field of Classification Search
CPC .... G06F 11/0793; G06F 11/073; G06N 5/022
USPC .................................................. 714/763, 773
See application file for complete search history.

(56) References Cited

U.S. PATENT DOCUMENTS

| 8,769,380 B1* | 7/2014 | Burd ..................... H04L 1/0042 714/781 |
| 11,275,646 B1* | 3/2022 | Nguyen ................. G06N 3/088 |
| 11,475,970 B1* | 10/2022 | Lee ....................... G11C 29/028 |
| 2017/0249206 A1* | 8/2017 | Jeong ................... G06F 11/0793 |
| 2018/0189149 A1* | 7/2018 | Alavi ................... G06F 11/0727 |
| 2018/0285197 A1* | 10/2018 | Kim ..................... G06F 11/1048 |
| 2020/0019453 A1* | 1/2020 | Chew .................. G06F 11/1008 |
| 2020/0089569 A1* | 3/2020 | Cadloni .............. G06F 11/1012 |
| 2020/0183783 A1* | 6/2020 | Xie ......................... G11C 16/10 |
| 2020/0192759 A1* | 6/2020 | Hwang ................ G06F 11/1048 |
| 2022/0114054 A1* | 4/2022 | Kim ....................... G06F 3/0602 |
| 2023/0103694 A1* | 4/2023 | Kang ..................... G11C 29/42 |

* cited by examiner

*Primary Examiner* — Albert Decady
*Assistant Examiner* — Osman M Alshack
(74) *Attorney, Agent, or Firm* — LOWENSTEIN SANDLER LLP

(57) ABSTRACT

A processing device in a memory sub-system identifies a set of parameters associated with one or more errors detected with respect to a memory device of a memory sub-system. A vector representing the set of parameters is generated. Based on the vector, a classification value corresponding to the one or more errors is generated. Based on the classification value, a set of error recovery operations is selected from a plurality of sets of error recovery operations, and the set of error recovery operations is executed.

17 Claims, 8 Drawing Sheets

CLASSIFICATION-BASED ERROR RECOVERY WITH REINFORCEMENT LEARNING

TECHNICAL FIELD

Embodiments of the disclosure relate generally to memory sub-systems, and more specifically, relate to perform classification-based error recovery with reinforcement learning in a memory device of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1A:
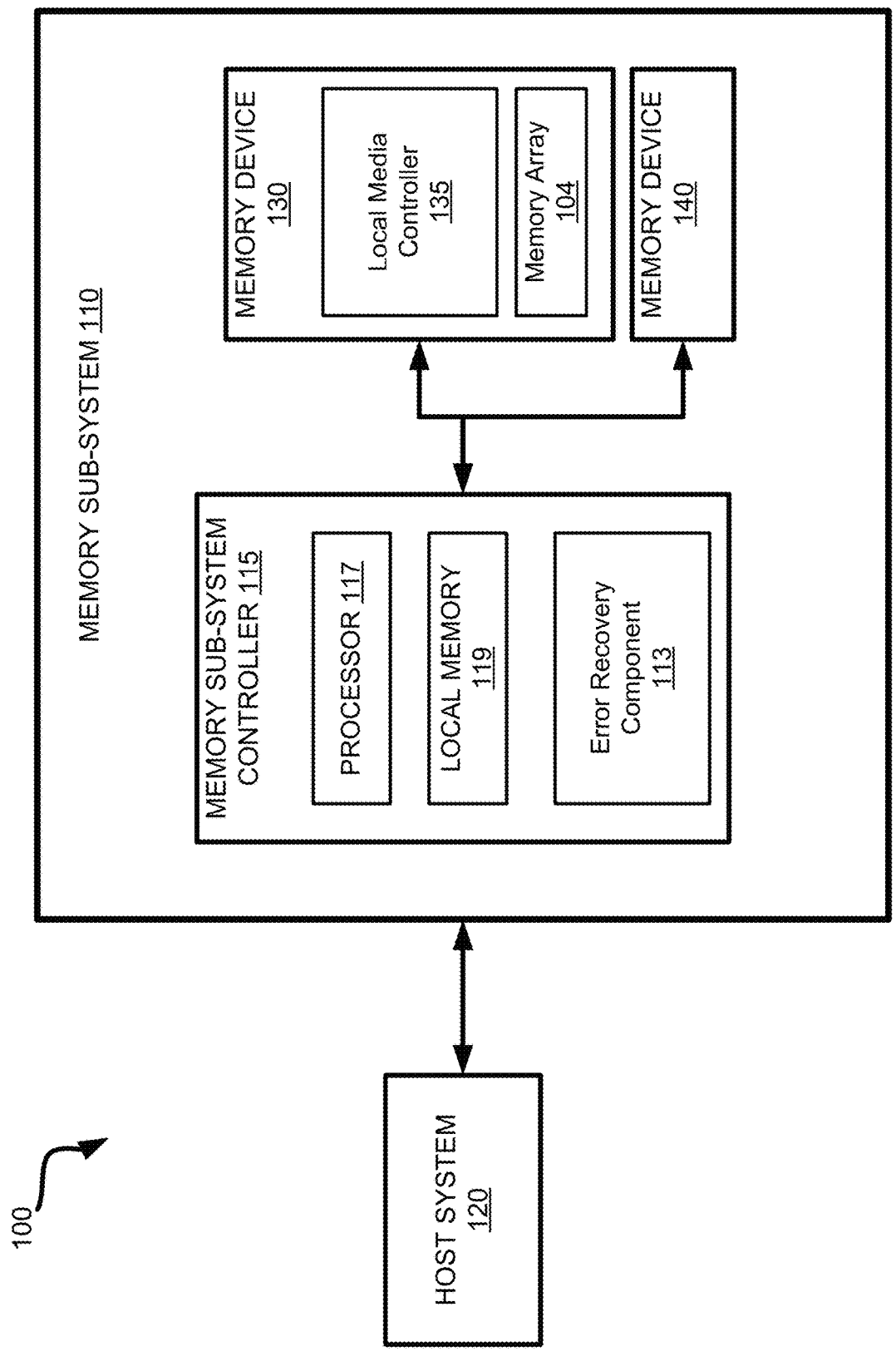
FIG. 1A illustrates an example computing system that includes a memory sub-system, in accordance with one or more embodiments of the present disclosure.

Aspects of the present disclosure are directed to classification-based error recovery with reinforcement learning in a memory device in a memory sub-system. A memory sub-system can be a storage device, a memory module, or a hybrid of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include memory cells arranged in a two-dimensional or a three-dimensional grid. The memory cells are formed onto a silicon wafer in an array of columns and rows. The memory cells are joined by wordlines, which are conducting lines electrically connected to the control gates of the memory cells, and bitlines, which are conducting lines electrically connected to the drain electrodes of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

One example of a memory sub-system is a solid-state drive (SSD) that includes one or more non-volatile memory devices and a memory sub-system controller to manage the non-volatile memory devices. A given segment of one of those memory devices (e.g., a block) can be characterized based on the programming state of the memory cells associated with wordlines contained within the segment. Due to a variety of reasons and causes, a defect relating to the memory device can cause an error within the data stored in the memory device. To address and remedy errors associated with data relating to a memory device, the memory sub-system can execute an error recovery process. A typical error recovery process includes a series of error recovery operations that are identified and defined based on memory device qualification requirements prior to implementation of the memory device. However, the predetermined error recovery process may fail to account for actual user workload and various inter-module interaction in firmware, such that the pre-implementation design constraints employed in configuring the error recovery process may no longer apply or may be detrimental to the error recovery performance goals.

Furthermore, a memory device can experience various different types of defects that result in different types of errors (e.g., errors and defects relating to endurance, retention, read disturb, cross temperature, transient threshold voltages, partial block misbehavior, etc.). Moreover, different defect types can be treated with a different error recovery process. As such, pre-determining a single error recovery process for a memory device fails to account for and optimize the error recovery process for different types of defects. In typical systems, a static list of predefined error recovery operations are performed, irrespective of the error type. This results in a longer error recovery time for certain error types and the inefficient treatment of all error types the same for the purposes of error recovery. In addition, systems that employ a single comprehensive error recovery list (e.g., a universal error recovery list) including error recovery operations that address many different types of errors significantly increase the risk of a command time-out (CTO) during the error recovery process.

Aspects of the present disclosure address the above and other issues by implementing a classification-based error recovery process. In an embodiment, during error recovery, an error type or error classification is identified for each of the one or more identified errors. In an embodiment, an error pattern including multiple different error types is identified. In an embodiment, an error recovery process is initiated in response to the detection of one or more errors. In an embodiment, the one or more errors (e.g., an error pattern) can include one or more different error types (e.g., a low endurance error type, a high cross-temperature error type, a data retention error type, a read disturb error type, etc.). The memory sub-system generates a vector representing the error pattern (herein referred to as an "error status vector"). In an embodiment, the vector represents one or more values associated with one or more error status parameters (e.g., temperature, a program/erase cycle count, a wordline number, a memory plane location, a valley health check, etc.) Using the error status vector, the memory sub-system classifies the one or more error types associated with the error pattern.

Advantageously, the system maintains multiple different sets of error recovery operations (also referred to as "error recovery suites"). Example error recovery operations can include one or more of a re-read operation, a re-read operation with a first negative offset, a re-read operation with a second negative offset, a re-read operation with a corrective read operation, a re-read operation with a soft decode operation, etc. An error recovery suite can be selected from the library of error recovery suites based on the one or more error types of the identified error pattern. A first error recovery suite can include a set of error recovery operations including a re-read operation, a re-read operation with a first negative offset, a re-read operation with a second negative offset, a re-read operation with a corrective read operation, a re-read operation with a soft decode operation. A second error recovery suite can include a re-read operation followed by a re-read operation with a soft decode operation. Other error recovery suites can include other combinations of error recovery operations. The selected error recovery suite and its corresponding error recovery operations are executed to enable error recovery in response to the identified error pattern. An error recovery result (e.g., a comparison of an error metric, such as raw bit error rate (RBER) to a threshold error level) is generated to determine if it passes or fails (e.g., whether the data with the one or more errors was successfully decoded). If the error recovery result is acceptable (e.g., a "passing" result), information relating to the error pattern, one or more identified error types, the executed error recovery suite, and the error recovery result are analyzed by a reinforcement function of a reinforcement module to generate reinforcement learning feedback information for use in subsequent error type classification processing. Advantageously, the reinforcement learning feedback information can be used to update and optimize the classifier 'in-field', following completion of the error recovery process.

In an embodiment, if the error recovery result is failing (i.e., the error decoding fails), the error result and related information (e.g., information relating to the error pattern, the one or more identified error types, the executed error recovery suite) are provided to the reinforcement module for generating the feedback information for the error type classifier. The feedback information can be used to train and improve the error type classifier to enable optimized error recovery suite selections during subsequent error recovery processing. In an embodiment, the reinforcement function module can generate a new error recovery suite and add the new error recovery suite to the set or library of error recovery suites for consideration during subsequent error recovery processing.

Advantageously, the classification-based error recovery processing with reinforcement training enables error recovery that is variably tuned to the requirements of the implemented memory device based on classified error types, and is not limited to a single predetermined error recovery approach. In addition, the classification-based error recovery handling leverages apriori knowledge of memory device error patterns and the execution of error recovery suites based on detected error types. This results in an optimized (e.g., in terms of latency) error recovery process configured for error recovery that is adapted based on different error patterns. Furthermore, the classification-based error recovery processing with reinforcement learning feedback can implement multiple different error recovery suites without significant memory utilization, even when new error recovery suites are added in response to newly identified error patterns.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., one or more memory device(s) 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., the one or more memory device(s) 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory device(s) 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory device(s) 130. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage the memory device 130 (e.g., perform media management operations on the memory device(s) 130). In some embodiments, a memory device 130 is a managed memory device, which is a raw memory device (e.g., memory array 104) having control logic (e.g., local controller 135) for media management within the same memory device package. An example of a managed memory device is a managed NAND (MNAND) device. Memory device(s) 130, for example, can each represent a single die having some control logic (e.g., local media controller 135) embodied thereon. In some embodiments, one or more components of memory sub-system 110 can be omitted.

In one embodiment, the memory sub-system 110 includes an error recovery component 113 that can implement the classification-based error recovery process with reinforcement learning with respect to one or more memory devices 130, 140, as described in detail herein. According to embodiments, the error recovery component 113 is controlled and managed by commands and instructions generated by the memory sub-system controller 115. The error recovery component 113 executes an error recovery process including the generating of an error status vector representing one or more error status parameters. Using the error status vector, the error recovery component 113 employs a classifier (e.g., a classifier function) to classify one or more error types (e.g., an error pattern) corresponding to the detected error(s) represented by the vector. The error recovery component 113 identifies and selects an error recovery suite or set from a library or set of different error recovery suites based on the one or more error type classifications. In an embodiment, each error recovery suite includes a set of error recovery operations that are executed to determine an error recovery result. The error recovery component 113 determines if the error recovery result is acceptable or unacceptable (e.g., whether the data decoding passes or fails). If the error recovery result is acceptable (e.g., the decoding passes), the error recovery information (e.g., the error type classifications, the selected error recovery suite, etc.) are processed by a reinforcement function of the error recovery component 113. The reinforcement function is configured to generate feedback information that can be used by the classifier of the error recovery component 113 during subsequent error type classification and recovery processing. In an embodiment, if the error result generated using the selected error recovery suite is unacceptable (e.g., the decoding fails), the error recovery component 113 can select and execute another error recovery suite from the library of error recovery suites or execute a complete or full error recovery suite including a full set of error recovery operations (e.g., all of the respective error recovery operations of the multiple error recovery suites managed by the error recovery component 113, also referred to as a "full error recovery suite"). Further details with regard to the operations of error recovery component 113 are described below.

Figure 1B:
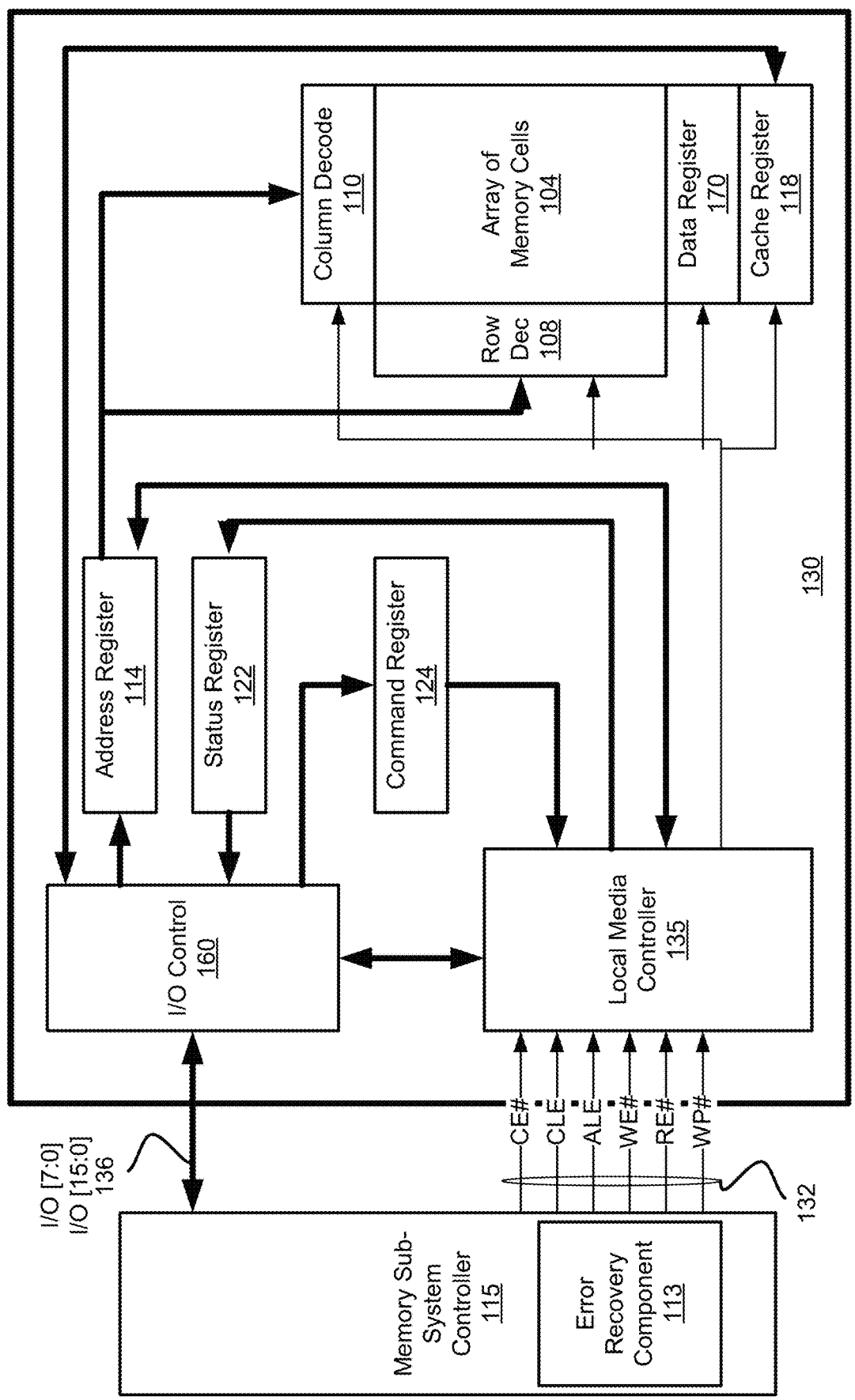
FIG. 1B is a block diagram of memory device(s) in communication with a memory sub-system controller of a memory sub-system, in accordance with one or more embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device(s) 130), may be a memory controller or other external host device.

Memory device(s) 130 includes an array of memory cells 104 logically arranged in rows and columns. Memory cells of a logical row are connected to the same access line (e.g., a wordline) while memory cells of a logical column are selectively connected to the same data line (e.g., a bitline). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 110 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device(s) 130. An address register 114 is in communication with I/O control circuitry 160 and row decode circuitry 108 and column decode circuitry 110 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 110 to control the row decode circuitry 108 and column decode circuitry 110 in response to the addresses. In one embodiment, the memory sub-system controller 115 includes the error recovery component 113 which are configured to enable communication between the memory sub-system controller 115 and the local media controller 135 to perform the steps and operations associated with the classification-based error recovery process with reinforcement training relating to one or more of memory device(s) 130, in accordance with embodiments of the present application.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a program operation (e.g., write operation), data may be passed from the cache register 118 to the data register 170 for transfer to the array of memory cells 104; then new data may be latched in the cache register 118 from the I/O control circuitry 160. During a read operation, data may be passed from the cache register 118 to the I/O control circuitry 160 for output to the memory sub-system controller 115; then new data may be passed from the data register 170 to the cache register 118. The cache register 118 and/or the data register 170 may form (e.g., may form a portion of) a page buffer of the memory device 130. A page buffer may further include sensing devices (not shown in FIG. 1B) to sense a data state of a memory cell of the array of memory cells 204, e.g., by sensing a state of a data line connected to that memory cell. A status register 122 may be in communication with I/O control circuitry 160 and the local memory controller 135 to latch the status information for output to the memory sub-system controller 115.

Memory device(s) 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 160 and may then be written into command register 124. The addresses may be received over input/output (I/O) pins [7:0] of I/O bus 136 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 118. The data may be subsequently written into data register 170 for programming the array of memory cells 104.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIGS. 1A-1B has been simplified. It should be recognized that the functionality of the various block components described with reference to FIGS. 1A-1B may not necessarily be segregated to distinct components or component portions of an integrated circuit device. For example, a single component or component portion of an integrated circuit device could be adapted to perform the functionality of more than one block component of FIGS. 1A-1B. Alternatively, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

Figure 2:
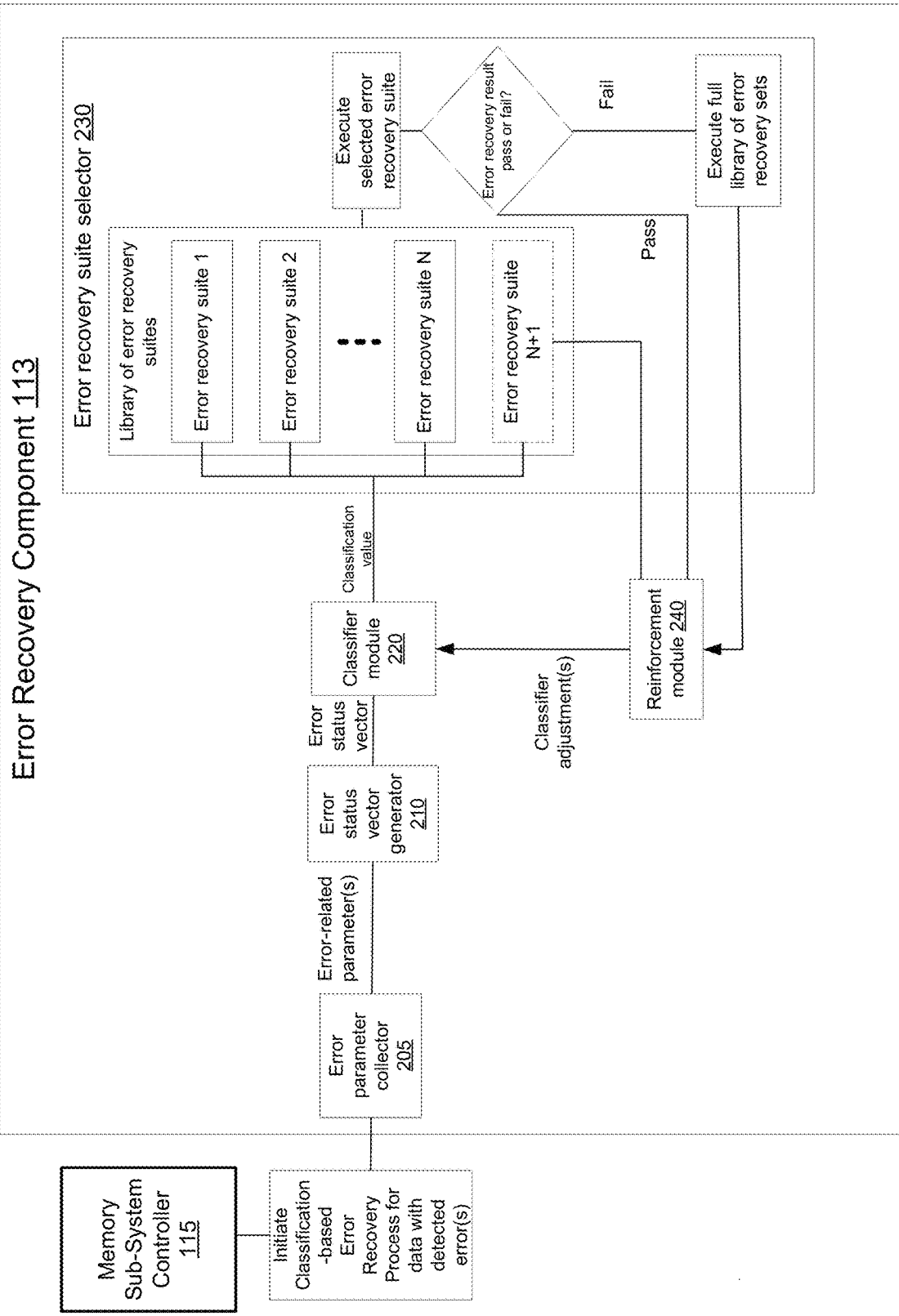
FIG. 2 illustrates an example error recovery component configured to execute a classification-based error recovery process with reinforcement training, in accordance with one or more embodiments of the present disclosure.

FIG. 2 illustrates an example error recovery component 113 configured to execute a classification-based error recovery process with reinforcement training (also referred to as the "classification-based error recovery process"), according to embodiments of the present disclosure. As illustrated, the error recovery component 113 can include one more modules, components, portions of processing logic to implement the classification-based error recovery process. The error recovery component 113 can include an error parameter collector 205, an error status vector generator 210, a classifier module 220, an error recovery suite selector 230, and a reinforcement module 240 configured to perform the steps and operations of the classification-based error recovery process in accordance with one or more embodiments of the present disclosure. The classification-based error recovery process can be performed by processing logic of the error recovery component 113 that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the classification-based error recovery process is performed by error recovery component 113 of FIGS. 1A and 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In an embodiment, the memory sub-system controller 115 detects an error associated with a memory device. In response, the memory sub-system controller 115 initiates execution of the classification-based error recovery process (e.g., by sending a command to the error recovery component 113). In a first phase of the classification-based error recovery process, the error parameter collector 205 collects a set of one or more parameters and corresponding values relating to the detected error. In an embodiment, the set of error-related parameters can include one or more system status parameters and values including, for example, temperature, program/erase cycles (PEC), wordline numbers, memory plane locations, etc. In an embodiment, the error-related parameters can include parameters and values generated by the memory sub-system controller 115 including, for example, disparity parameters or histogram values before decode, iteration count values, bit error count (BEC) values, or directional bit error count values after decode, etc. In an embodiment, the set of error-related parameters collected by the error parameter collector 205 can include memory device-related status parameters and values including, for example, sensing voltages, sensing time, bit distribution, etc. In an embodiment, the set of error-related parameters can be collected by the error parameter collector 205 as a result of the execution of one or more a read retry operation.

In an embodiment, the error parameter collector 205 provides the set of error-related parameters to the error status vector generator 210. The error status vector generator 210 generates a vector representation based on the set of error-related parameters. The vector (also referred to as an "error status vector") is an n-dimensional (ND) vector that represents the set of error-related parameters and corresponding values as determined by the error parameter collector 205. In an embodiment, the error status vector is an n-dimensional vector (V) includes n components (e.g., X1, X2, . . . , Xn; where X represents an error parameter and corresponding value component of the set of error-related parameters).

Figure 3:
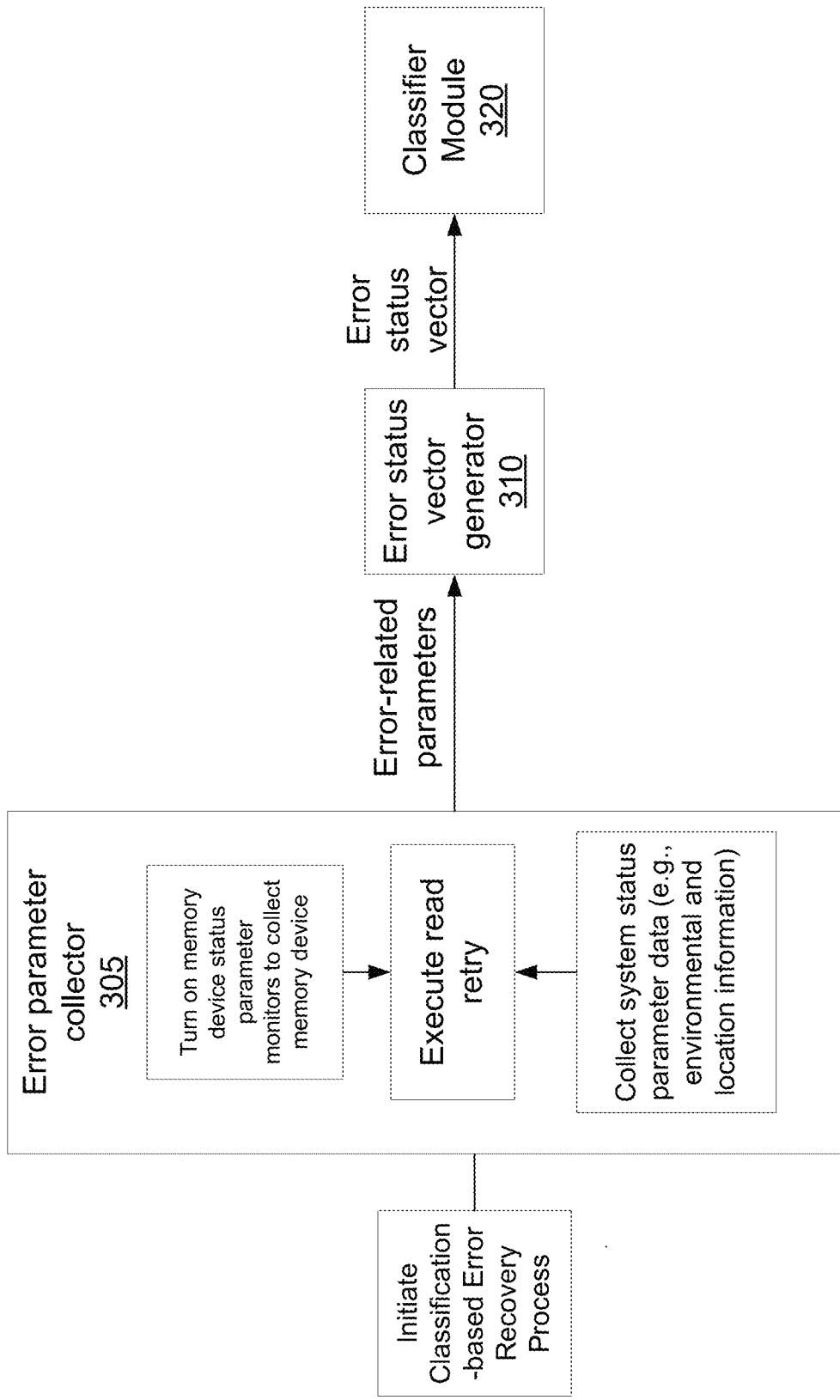
FIG. 3 illustrates an example embodiment of the error parameter collection and error status vector generation portions of the classification-based error recovery process, in accordance with one or more embodiments of the present disclosure.

FIG. 3 illustrates an example embodiment of the error parameter collection and error status vector generation portions of the classification-based error recovery process. As shown in FIG. 3, upon initiation of the classification-based error recovery process with respect to a memory device, a read retry operation can be executed. In an embodiment, execution of the read retry operation initiates the collection of parameters and values that are part of the set of error-related parameters generated by the error parameter collector 305. In an embodiment, the read retry operation can be initiated in response to a command or signal from the memory sub-system controller (e.g., memory sub-system controller 115 of FIGS. 1A, 1B, and 2).

In an embodiment, during the error-related parameter collection phase, a command or signal is provided to one or more monitors of the memory device to turn on to enable collection of one or more memory device-related status parameters and values. In an embodiment, turning on the one or more monitors of the memory device can include turning on one or more registers of the memory device to collect one or more corresponding memory device-related parameters and values. In an embodiment, the command to turn on the monitors (e.g., turn on one or more registers of the memory device to collect one or more corresponding parameters) can be sent by the memory sub-system controller (e.g., memory sub-system controller 115 of FIGS. 1A, 1B, and 2) or the error parameter collector 305. Example memory device-related parameters collected via the memory device monitors can include, for example, sensing voltages, sensing time, a previous program time, information relating to previous program pulses, active correction values for a read operation, program bit distributions, etc.

In an embodiment, the execution of read retry operation can further initiate the collection of one or more system status parameters and values. In an embodiment, the system status parameters that are collected and used to form the set of error-related parameters generated by the error parameter collector 305 can include environmental and location information, such as, for example, temperature, program/erase count (PEC), page number, block number, wordline number, disparity parameters or histogram values, iteration count values, bit error count (BEC) values, directional bit error count values, etc.

As shown in FIG. 3, the error-related parameters are provided by the error parameter collector 305 to the error status vector generator 310. The error status vector generator generates the n-dimensional error status vector based on the set of error-related parameters. Advantageously, the error status vector is a vector representation of the error-related parameters and values that can be provided to classifier module 320 for use in determining an error type or classification associated with the error status vector.

Figure 4:
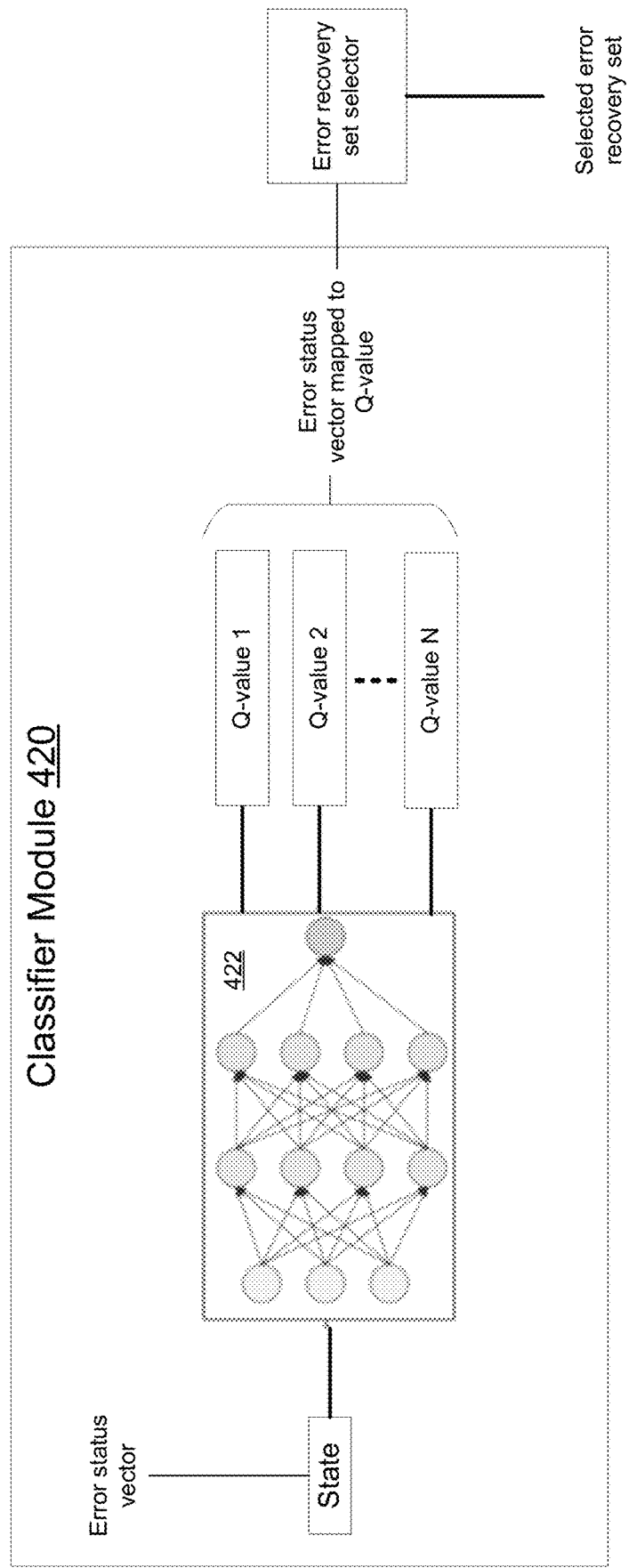
FIG. 4 illustrates an example classifier module configured to receive an input state including an error status vector and include a classifier function to generate a Q-value that corresponds to the error status vector, in accordance with one or more embodiments of the present disclosure.

With reference to FIG. 2, the classifier module 220 receives the error status vector from the error status vector generator 210. The classifier module 220 is configured to execute a classification process (e.g., a classifier function) to map the error status vector to a classification value or Q-value. FIG. 4 illustrates an example classifier module 420 configured to receive the error status vector (e.g., as an input state) and include a classifier function 422 to generate a Q-value that corresponds to the error status vector. In an embodiment, the classifier function 422 identifies a Q-value from a set of candidate Q-values (e.g., Q-value 1, Q-value 2 . . . Q-value N). As shown in FIG. 4, each Q-value is mapped to a corresponding error recovery suite (e.g., error recovery suites 1 through N, as shown in FIG. 2). For example, Q-value 1 can be mapped to error recovery suite 1, Q-value 2 can be mapped to error recovery suite 2, . . . and Q-value N can be mapped to error recovery suite N.

In an embodiment, the classifier function 422 can be a machine-learning network or neural network including a trainable set of nodes configured to compute the classification value (e.g., the Q-value) for a given input state (e.g., an input error status vector). In an embodiment, classifier function 422 can be initially trained to compute the Q-values based on the input vectors during an initial training phase. In an embodiment, the classifier function 422 can include a neural network having multiple layers of computational units (i.e., nodes) each having one or more weighted input connections, a transfer function that combines the inputs, and an output connection. In an embodiment, the classifier function 422 can maintain a set of weights corresponding to different error-related parameters represented by the error status vector. In an embodiment, the classifier function 422 can adjust the weights assigned to the respective error parameters based on reinforcement learning feedback information, as described in greater detail below. In an embodiment, the weight adjustment can include a reward (e.g., an increase in a corresponding weight) or a penalty (e.g., a decrease in a corresponding weight) based on the reinforcement learning processing performed by the reinforcement module (e.g., reinforcement module 240 of FIG. 2). Advantageously, the classifier function 422 can be configured to require a low computational expenditure to reduce the latency impact during the classification phase of the process.

With reference to FIG. 2, the computed classification value (Q-value) is provided by the classifier module 220 to the error recovery suite selector 230. As described above, the error recovery suite selector 230 can maintain a library or set of different error recovery suites (e.g., error recovery suite 1, error recovery suite 2, . . . error recovery suite N), where each error recovery suite includes an ordered set or combination of predefined error recovery steps or operations. For example, error recovery suite 1 can include a first ordered list of operations configured for a first type or classification of errors (e.g., a read disturb error type, where, for example, the error recovery operations are configured to address a particular read level that is degraded by read disturb), error recovery suite 2 can include a second ordered list of operations configured for a second error type or classification (e.g., a data retention error type, where, for example, the error recovery operations have a balanced treatment for all read levels, per the retention characteristics), the error recovery suite N can include an Nth ordered list of operations configured for an Nth type or classification of errors (e.g., a cross-temperature error type, where, for example, the error recovery operations apply a specific temperature compensation). In an embodiment, the error recovery suite selector 230 can maintain a data structure to store the library of multiple error recovery suites and corresponding sets of error recovery operations.

As described above, each classification value can be mapped to a respective error recovery suite. Accordingly, the error recovery suite selector 230 can use the computed classification value to select a corresponding error recovery suite. As shown in FIGS. 2 and 4, the error recovery set selector selects the error recovery suite based on the computed classification value and the selected suite of error recovery operations is executed. In an embodiment, the selected error recovery suite is executed and an error recovery result is generated. As shown in FIG. 2, a determination is made whether the error recovery result is acceptable (i.e., the error decoder unacceptable. In an embodiment, the error recovery result (also referred to as a "decode result") is a passing result if the data including the one or more errors can be decoded successfully by a decoder. In an embodiment, the decode result is generated according to an ECC decoding operation. In an embodiment, the error recovery suite selector 230 can operatively couple to a decoder including a status indicator that indicates if the error recovery result passes or fails.

In an embodiment, the memory sub-system controller determines whether the decoding process is successful in view of a return status communication including the detected error bit count to indicate the decode quality. The error bit count is compared to a threshold error level to determine if a first condition is satisfied indicating a good or acceptable result (e.g., the detected error bit count is less than or equal to the threshold error level) or if a second condition is satisfied indicating a bad or unacceptable result (e.g., the detected error bit count is above the threshold error level). In an embodiment, the error recovery results can be used as training data (e.g., training sets) for training the supervised learning model.

As shown in FIG. 2, upon determining the selected error recovery suite fails to adequately decode the data with the detected error, the error recovery suite selector 230 can execute a "global" or "full" error recovery suite. In an embodiment, the full error recovery suite can include a complete set of error recovery operations (e.g., all of the error recovery operations of error recovery suite 1, error recovery suite 2, . . . and error recovery suite N). In an embodiment, the full error recovery suite can be executed in response to instances where the selected error recovery suite is unsuccessful or the generated classification value (Q-value) is associated with an undefined error pattern (i.e., the computed classification value does not map to an existing error recovery suite that produces a passing error recovery result).

As shown in FIG. 2, following execution of the selected error recovery suite, for both the passing result and failing result, a set of information relating to the error recovery process (also referred to as "reinforcement learning information") is provided to the reinforcement module 240. In an embodiment, the set of information can include, but is not limited to, information identifying the selected error recovery suite, the classification value, the error recovery result, etc. The reinforcement module 240 is configured to execute a reinforcement function to generate one or more classifier adjustments based on the reinforcement learning information. In an embodiment, the classifier adjustments can include an adjustment, update, or change of one or more weights used by the classifier module 220. In an embodiment, the reinforcement module 240 provides a feedback loop that can be used for training the classifier function of the classifier module 220 to enable the generation of more accurate classification values during subsequent iterations of the classification-based error recovery process.

Figure 5:
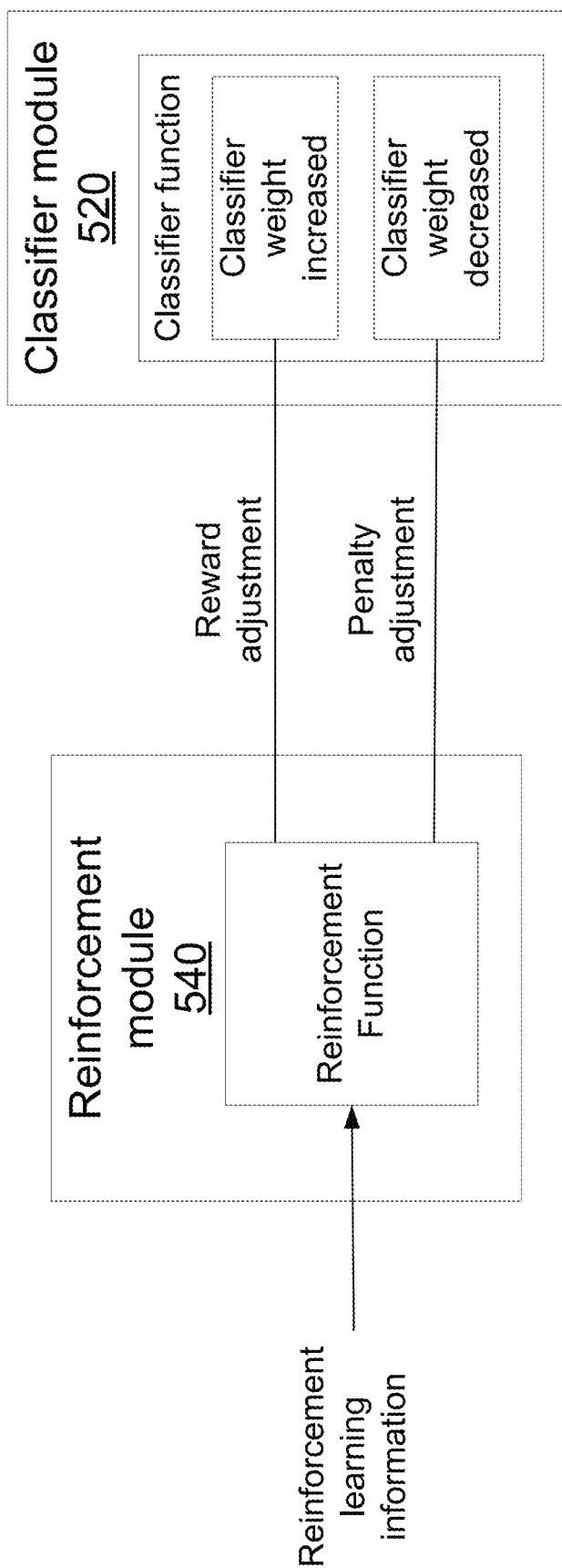
FIG. 5 illustrates an example reinforcement module operatively coupled to a classifier module to provide a reinforcement training feedback loop for adjusting a classifier function configured to generate a classification value, in accordance with one or more embodiments of the present disclosure.

FIG. 5 illustrates an example reinforcement module 540 operatively coupled to a classifier module 520 to provide a reinforcement training feedback loop for adjusting a classifier function configured to generate a classification value, according to embodiments of the present disclosure. As shown in FIG. 5, the reinforcement module 540 includes a reinforcement function configured to receive the reinforcement learning information (e.g., the classification value, information identifying the selected error recovery suite, the error recovery result, etc.). The reinforcement function is configured to either reward or penalize at least a portion of the classifier (e.g., a portion associated with the identified error type) based on the error recovery result. In an embodiment, the reinforcement function uses a successful error recovery result to enhance a weighting associated with the portion of the classifier corresponding to the identified error type or classification. For example, the reinforcement function can adjust one or more weights (increase or decrease the weights) for one or more nodes corresponding to a portion of the classifier function used to generate the classification value.

As shown in FIG. 5, in response to a passing error recovery result, the reinforcement function can generate a reward adjustment to increase one or more weights associated with one or more nodes of the classifier function of the classifier module 520. In an embodiment, in response to a failing error recovery result, the reinforcement function can generate a penalty adjustment to decrease one or more weights associated with one or more nodes of the classifier function of the classifier module 520. In an embodiment, the reinforcement function can update the weights associated with one or more nodes of a portion of the classifier by backpropagating the error received from the ECC decoder as part of the reinforcement learning process.

In an embodiment, the reinforcement function of the reinforcement module 540 can generate a new error recovery suite (e.g., error recover suite N+1 shown in FIG. 2) in response to failing error recovery result. In an embodiment, the newly generated error recovery suite N+1 can be added to the data structure including the library of error recovery suites managed by the error recovery suite selector 230 of FIG. 2. In an embodiment, the new error recovery suite can be mapped or associated with the classification value that was used in selecting the previously executed error recovery suite (i.e., the error recovery suite that resulted in the failure to decode the error). In an embodiment, in a subsequent iteration of the classification-based error recovery process, if error-related parameters are collected and a vector is generated which is classified with the same classification value, the error recovery suite selector 230 can select and execute the new error recovery suite N+1.

Figure 6:
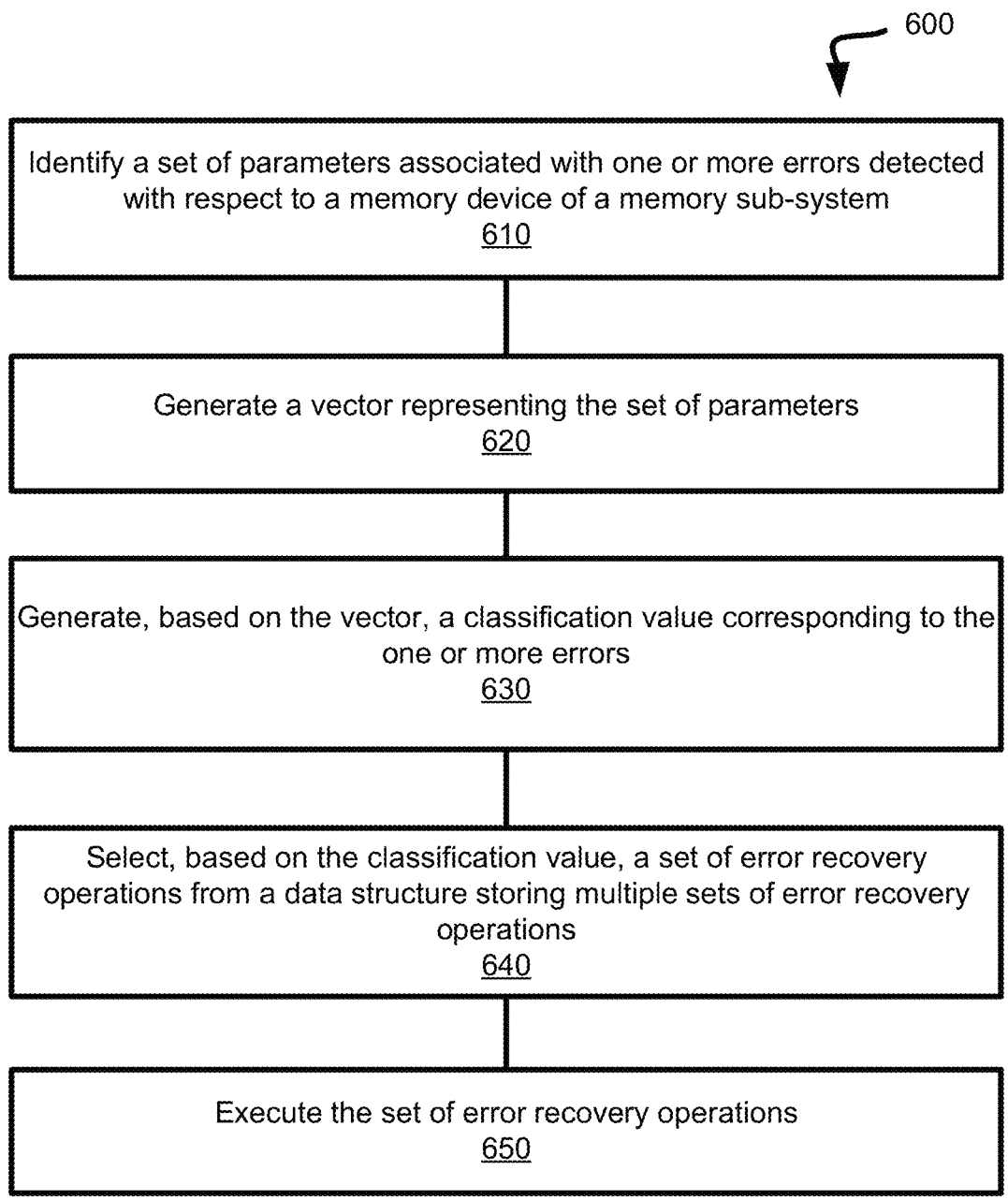
FIG. 6 is a flow diagram of an example method of executing a set of error recovery operations selected based on a classification of an error associated with a memory device of a memory sub-system, in accordance with one or more embodiments of the present disclosure.

FIG. 6 is a flow diagram of an example method of executing a set of error recovery operations selected based on a classification of an error associated with a memory device of a memory sub-system, in accordance with one or more embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by error recovery component 113 of FIGS. 1A, 1B, and 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic (e.g., error recovery component 113) identifies a set of parameters associated with one or more error detected with respect to a memory device of a memory sub-system. In an embodiment, the set of parameters include one or more error-related parameters and values that are collected in response to the detection of the one or more errors. In an embodiment, a read retry operation is executed to initiate the identification and collection of the set of parameters. In an embodiment, the set of parameters can include one or more system status parameters and values (e.g., temperature, PEC, wordline number, plane location, valley health check information, etc.), one or more memory sub-system controller-generated status parameters and values (e.g., a disparity data, histogram data, iteration count, bit error count, directional bit error count, etc.), and/or one or more memory device-generated parameters and values (e.g., sensing voltage, sensing time, bit distribution data, etc.).

In operation 620, the processing logic generates a vector representing the set of parameters. In an embodiment, the set of error-related parameters and values are combined and used to form an n-dimensional vector. In operation 630, the processing logic generates, based on the vector, a classification value corresponding to the one or more errors. In an embodiment, the classification value (e.g., a Q-value) is a representation of a type or class of the one or more errors. Advantageously, using the vector representation of the error-related parameters and values, the classification value can be produced. In an embodiment, a classifier function including a trained neural network of nodes can be applied to the vector to map the vector to a classification value. According to embodiment, different classification values (e.g., different Q-values) correspond to different error patterns. Accordingly, the classification value can be used to classify the identified error pattern into a particular error type or classification (e.g., a read disturb error type, a data retention error type, a cross-temperature error type, etc.).

In operation 640, the processing logic selects, based on the classification value, a set of error recovery operations (e.g., an error recovery suite) from a data structure storing multiple sets of error recovery operations. In an embodiment, each classification value (e.g., each Q-value) is mapped to a corresponding error recovery suite (e.g., a set of error recovery operations) of a library of multiple error recovery suites. In an embodiment, each set of error recovery operations is an ordered combination of predefined error recovery steps or operations that are configured to efficiently address and recover based on a particular error type or classification. For example, a first set of error recovery operations can include a first ordered combination of operations configured to address a first type of error, a second set of error recovery operations can include a second ordered combinations of operations configured to address a second type of error, and so on. In an embodiment, each classification value is mapped or associated with a set of error recovery operations of the library of multiple sets of error recovery operations. In an embodiment the Q value is an integer that may be normalized (e.g., rounded up or rounded down) to a normalized value that can be mapped to a Q value associated with an error recovery suite.

At operation 650, the processing logic executes the set of error recovery operations. In an embodiment, the set of error recovery operations (e.g., the selected error recovery suite corresponding to the classification value) is executed to generate an error recovery result. The error recovery result can indicate either a passing (e.g., successful decoding by a decoder) or failing (unsuccessful decoding by the decoder). In an embodiment, the processing logic can cause reinforcement learning information to be collected and analyzed by a reinforcement function. The reinforcement function can adjust one or more weights associated with the classifier function in view of the error recovery result. For example, if the classification value maps to an error recovery suite that produces a passing error recovery result, the reinforcement function can reward or increase one or more weights associated with the portion of the classifier function (e.g. a set of nodes of a neural network) used to generate the classification value. In another example, if the classification value maps to an error recovery suite that produces a failing error recovery result, the reinforcement function can penalize or decrease one or more weights associated with the portion of the classifier function used to generate the classification value.

Figure 7:
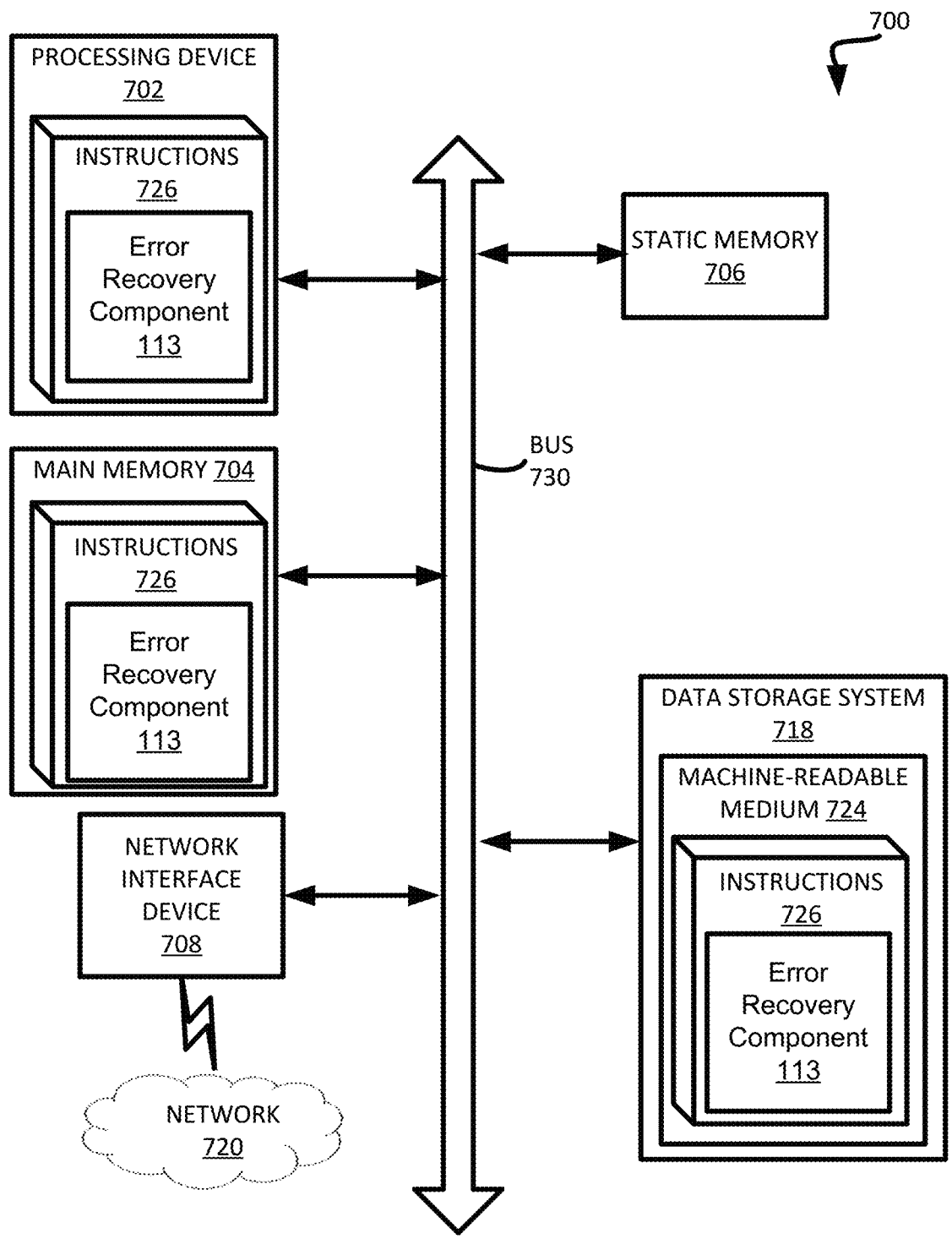
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1A) that includes, is coupled to, or utilizes a memory sub-system (e.g., the memory sub-system 110 of FIGS. 1A and 1B) or can be used to perform the operations of a controller (e.g., to execute an operating system to perform operations corresponding to the error recovery component 113 of FIGS. 1A and 1B). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIGS. 1A and 1B.

In one embodiment, the instructions 726 include instructions to implement functionality corresponding to the error recovery component 113 of FIGS. 1A and 1B). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
identifying a set of parameters associated with a set of a plurality of errors detected with respect to the memory device of a memory sub-system;
generating a vector representing the set of parameters associated with the set of the plurality of errors;
mapping the vector to a classification value corresponding to the set of the plurality of errors;
selecting, based on the classification value, a first set of a plurality of error recovery operations from a plurality of sets of error recovery operations;
executing the first set of the plurality of error recovery operations; and
generating reinforcement information based at least in part on the classification value and the first set of the plurality of error recovery operations.

2. The system of claim 1, the operations further comprising determining an error recovery result based on the executing of the first set of the plurality of error recovery operations.

3. The system of claim 1, wherein the classification value represents an error type corresponding to the set of the plurality of errors.

4. The system of claim 3, wherein the first set of the plurality of error recovery operations comprises a first ordered combination of operations to be performed to recover from set of the plurality of errors having the error type corresponding to the classification value.

5. The system of claim 1, the operations further comprising:
adjusting, based on the reinforcement information, one or more weights associated with a classifier function used to generate the classification value.

6. The system of claim 5, wherein the adjusting comprises one of:
rewarding the one or more weights in response to a passing error recovery result associated with the executing of the first set of the plurality of error recovery operations; or
penalizing the one or more weights in response to a failing error recovery result associated with the executing of the first set of the plurality of error recovery operations.

7. A method comprising:
identifying, by a processing device, a set of parameters associated with a set of a plurality of errors detected with respect to a memory device of a memory sub-system;
generating a vector representing the set of parameters associated with the set of the plurality of errors;
mapping the vector to a classification value corresponding to the set of the plurality of errors;
selecting, based on the classification value, a first set of a plurality of error recovery operations from a plurality of sets of error recovery operations;
executing the first set of the plurality of error recovery operations; and
generating reinforcement information based at least in part on the classification value and the first set of the plurality of error recovery operations.

8. The method of claim 7, further comprising determining an error recovery result based on the executing of the first set of the plurality of error recovery operations.

9. The method of claim 7, wherein the classification value represents an error type corresponding to the set of the plurality of errors.

10. The method of claim 9, wherein the first set of the plurality of error recovery operations comprises an ordered combination of operations configured to recover from the set of the plurality of errors having the error type corresponding to the classification value.

11. The method of claim 7, further comprising adjusting, based on the reinforcement information, one or more weights associated with at least a portion of a classifier function used to generate the classification value.

12. The method of claim 11, wherein the adjusting comprises one of:
rewarding the one or more weights in response to a passing error recovery result associated with the executing of the first set of the plurality of error recovery operations; or
penalizing the one or more weights in response to a failing error recovery result associated with the executing of the first set of the plurality of error recovery operations.

13. A non-transitory computer-readable storage medium comprising instructions that, when executed by a processing device, cause the processing device to perform operations comprising:
identifying a set of parameters associated with a set of a plurality of errors detected with respect to a memory device of a memory sub-system;
generating a vector representing the set of parameters associated with the set of the plurality of errors;
mapping the vector to a classification value corresponding to the set of the plurality of errors;
selecting, based on the classification value, a first set of a plurality of error recovery operations from a plurality of sets of error recovery operations;
executing the first set of the plurality of error recovery operations; and
generating reinforcement information based at least in part on the classification value and the first set of the plurality of error recovery operations.

14. The non-transitory computer-readable storage medium of claim 13, the operations further comprising determining an error recovery result based on the executing of the first set of the plurality of error recovery operations.

15. The non-transitory computer-readable storage medium of claim 13, wherein the classification value represents an error type corresponding to the set of the plurality of errors.

16. The non-transitory computer-readable storage medium of claim 15, wherein the first set of the plurality of error recovery operations comprises an ordered combination of operations configured to recover from the set of the plurality of errors having the error type corresponding to the classification value.

17. The non-transitory computer-readable storage medium of claim 13, the operations further comprising adjusting, based on the reinforcement information, one or more weights associated with at least a portion of a classifier function used to generate the classification value, wherein the adjusting comprises one of:
rewarding the one or more weights in response to a passing error recovery result associated with the executing of the first set of the plurality of error recovery operations; or
penalizing the one or more weights in response to a failing error recovery result associated with the executing of the first set of the plurality of error recovery operations.

* * * * *